Feb. 13, 1934.    R. O. KAPP ET AL    1,946,859
PROTECTIVE ARRANGEMENT FOR ELECTRIC POWER LINES
Original Filed May 23, 1929    4 Sheets-Sheet 1

Inventor:
R. O. Kapp and
C. G. Carrothers
By Emil Bönnelycke
Attorney

Feb. 13, 1934.    R. O. KAPP ET AL    1,946,859
PROTECTIVE ARRANGEMENT FOR ELECTRIC POWER LINES
Original Filed May 23, 1929    4 Sheets-Sheet 4

Inventors:
R. O. Kapp and
C. G. Carrothers
By Emil Bömelche
Attorney

Patented Feb. 13, 1934

1,946,859

UNITED STATES PATENT OFFICE 1,946,859

PROTECTIVE ARRANGEMENT FOR ELECTRIC POWER LINES

Reginald Otto Kapp and Charles George Carrothers, London, England

Original application May 23, 1929, Serial No. 365,527, and in Great Britain May 23, 1928. Divided and this application November 9, 1932, Serial No. 641,940

8 Claims. (Cl. 175—294)

The present invention relates to improvements in or relating to protective arrangements for electric transmission systems whether, for example, for power lines in an overhead transmission system or for cables in a high tension underground system and, more particularly, concerns improved arrangements for clearing faults on a line or cable with a minimum amount of disturbance to the system of which the line or cable forms a part, the general object of such arrangements being to isolate only the faulty section, while the remainder of the system remains in service.

The principal object of the invention is to provide such arrangements which will permit of the pilot wire being located in such a position relative to the conductors carrying the power that the occurrence of a fault might cause the pilot wire, as well as the power conductors, to be broken.

One of the features of the present invention is a protective arrangement in which a pilot wire embedded in the cable containing the power conductors is utilized, the controlling arrangements being such that even if the pilot wire is broken the automatic isolation of the section is permitted when a fault occurs.

Another feature of the present invention is a protective arrangement in which a pilot wire forms one of the strands of a stranded earthing wire in an overhead transmission line located on the same standards as the power conductors, the controlling arrangement in this case also being such that even if the pilot wire circuit is broken the complete isolation of the section is permitted when a fault occurs.

These and other features of the invention will be better understood by referring to the following description with reference to the accompanying drawings which show by way of example various embodiments of the invention.

Figure 6:
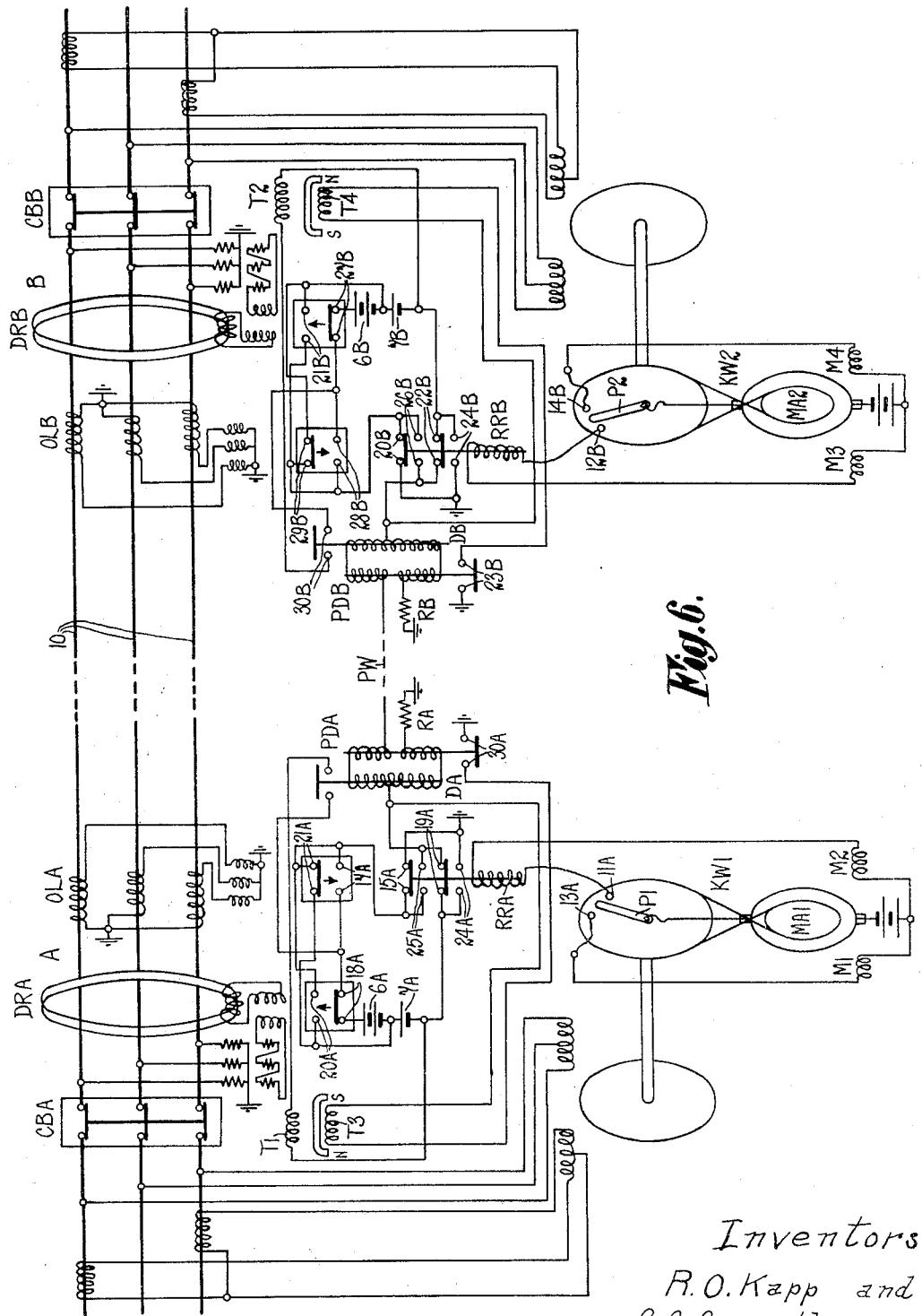

Fig. 6 shows circuit controlling arrangements controlled in conjunction with a pilot wire and resembling circuit arrangements employed in quadruplex signalling in which one channel is employed for protecting the section from faults of the kind in which earth currents are sufficiently great as to change the direction of current flow or substantially arrest the flow of current at one end, i. e. when the difference between the current flowing into or in the section at one end and out at the other are very considerable, while the other channel is employed for protecting the section from faults of the kind in which the leakage is comparatively small as in underground cables and is determined by the different manners in which current or power measuring devices at each end of the section respond to the current power flowing at the end with which they are associated.

Figure 1:
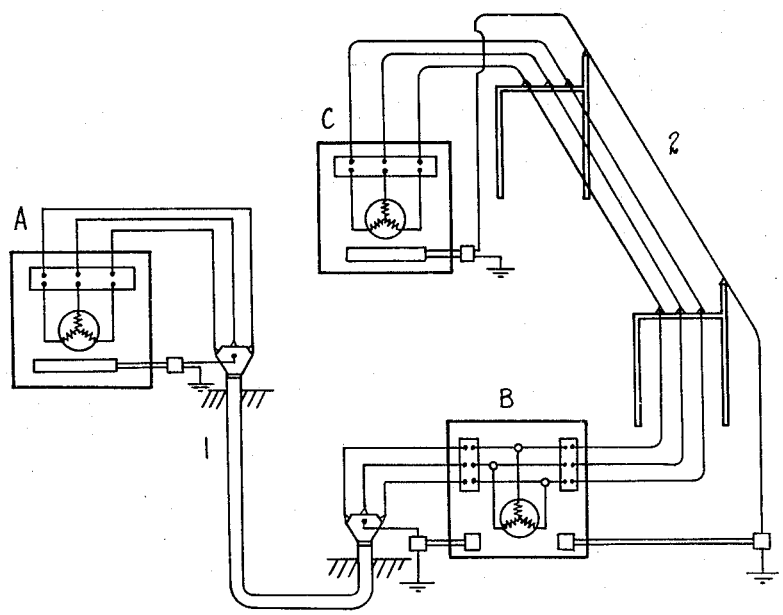
Fig. 1 shows a transmission system including both an overhead transmission line and an underground cable, together with protecting arrangements suitable for isolating faults according to the individual conditions of the various lines.
Figure 2:
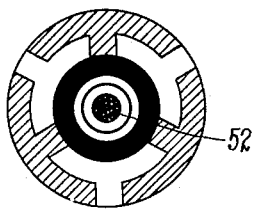
Fig. 2 shows a section of stranded earth wire with interlocked strands having an insulated pilot wire forming one of the strands for use with overhead transmission lines.
Figure 3:
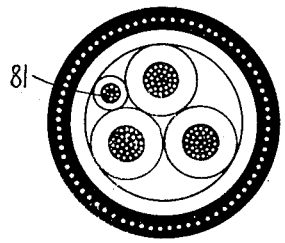
Fig. 3 shows a section of a cable having a pilot wire embedded therein for use with underground transmission lines.

Referring to Fig. 1, this shows a complete transmission of three phase high tension alternating current comprising the underground cable 1 and the overhead transmission line 2. The stations A and B are generating stations adapted to supply power to the system or take power from the system according as to whether the local demand for power is below or above the amount generated locally while station C is purely a power consuming station.

While Fig. 1 only shows the protective apparatus in a very schematic manner, details of the apparatus and its manner of operation will be described more particularly with reference to Figs. 4, 5 and 6 of the accompanying drawings.

In the case when current is fed to a terminal station where there is no generating apparatus, such as the station C, it will be appreciated that if a fault occurs, current can only be fed to the fault from station B. Protective arrangements at the upper right hand side of station B and station C are shown in detail in the left hand sides of Figs. 4 and 5 and the right hand sides of Figs. 4 and 5 respectively. Underground cables are normally subject to two kinds of faults as distinct from the kind to which overhead transmission lines are subject, namely, faults of a serious character involving heavy current to earth and faults in the nature of leaks often termed "incipient faults". The cable 1 running between the stations A and B is protected from both these kinds of faults by protective arrangements in these stations, such as are shown more in detail in Fig. 6.

Figure 4:
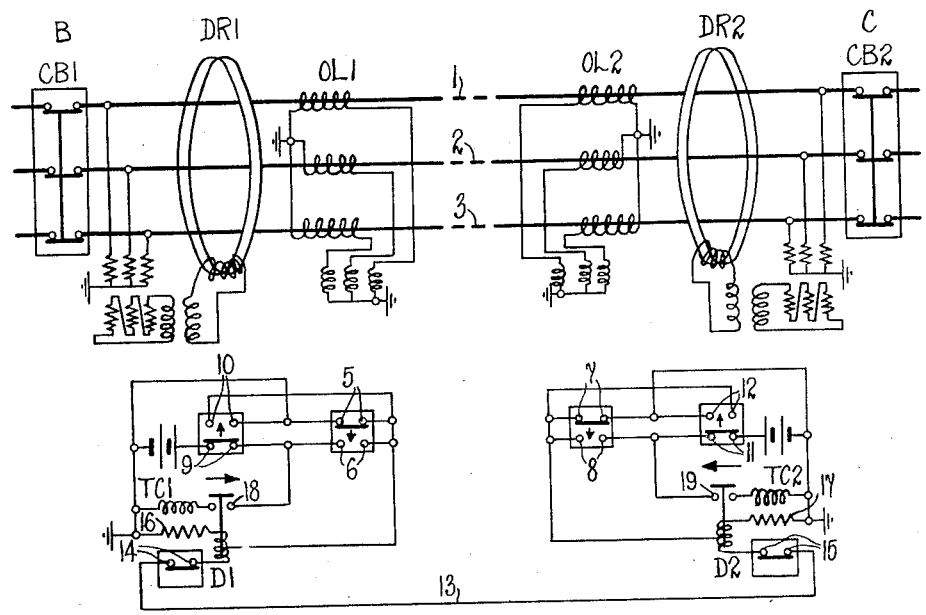
Fig. 4 shows circuit controlling arrangements employed in conjunction with a pilot wire and applicable only to sections in which power is supplied from one end.

Referring now to Fig. 4, this shows an arrangement for cutting out a faulty section in the event of current flowing in at one end of a section and either current less than a predetermined value flowing out at the other end, or current flowing in at the other end. This is satisfactory in the case of all faults which cause the voltage to drop nearly to zero. In Fig. 4, 1, 2 and 3 represent the section of a three phase transmission line between the stations B and C; CB1 and CB2 represent the circuit breakers at opposite ends of the section; OL1 and OL2 represent over-current relays, that is to say relays which operate when the current flowing through them exceeds a certain predetermined amount. These relays are of known type and are arranged so that an excess of current flowing past the relays in any one or more of the lines 1, 2 or 3 will cause the contacts 5 and 7 to open and 6 and 8 to close. DR1 and DR2 represent directional relays and are arranged to close contacts 9 and 11 both when no power is flowing and when power is flowing past the relays into the section and to close contacts 10 and 12 when power above a predetermined magnitude less than the predetermined amount necessary to operate the over-current relays is flowing past the respective relays in the other directions; 13 represents the pilot wire; TC1 and TC2 represent the tripping coils of the circuit-breakers CB1 and CB2 respectively; D1 and D2 represent the differential relays arranged for duplex working in a manner to be described hereinafter; 14 and 15 represent contacts in the pilot wire circuit controlled by the tripping coils TC1 and TC2 respectively. The figure shows the condition with no current flowing at all in the leads 1, 2 or 3. In this condition no circuits are closed.

The following table indicates the position taken up by the relays OL1, DR1, D1, OL2, DR2, D2 under various conditions on the line:—

| Conditions on line | Positions of relays | | | | | |
|---|---|---|---|---|---|---|
| | OL1 | DR1 | D1 | OL2 | DR2 | D2 |
| 1. Straight through overload current from left to right | Down | Down | Up | Down | Up | Down. |
| 2. Straight through overload current from right to left | Down | Up | Down | Down | Down | Up. |
| 3. Fault on line fed from both ends with voltage either up or down to nearly zero. | Down | Down | Down | Down | Down | Down. |
| 4. Fault on line fed from left end only | Down | Down | Up | Up | Down | Down. |
| 5. Fault on line fed from right end only | Up | Down | Down | Down | Down | Up. |

In the first case, i. e. straight through current flowing from left to right, it will be noted that a circuit may be traced as follows: earth, battery contacts 9, 6 to midpoint of winding of relay D1. Here the current divides, one half proceeding via the upper winding of relay D1, resistance 16 to earth, the other half proceeding via the lower winding of relay D1, contact 14, pilot wire 13, contact 15, lower winding of differential relay D2, contact 12 to earth. Relay D2 is energized and contact 19 is closed. This however is without effect as contact 11 of relay DR2 is open.

Under the second condition with straight through current flowing through from right to left it will be noted that the condition is substantially the same as in the preceding case, the only difference being in the position of relays DR1, D1, DR2 and D2.

Referring to the third case in which a fault on the line is fed from both ends whatever the volts may be, i. e. either up or right down then both the relays DR1 and DR2 will be down. Similarly OL1 and OL2 will have their armatures down. Consequently contacts 9 and 6 will be closed at one end and 11 and 8 at the other. The midpoint of the differential relay in each case will therefore be connected to the same potential as follows: earth, battery, contact 9, contact 6 to the midpoint of relay D1. Earth, battery, contact 11, contact 8 to the midpoint of relay D2. Consequently there would be no current on the pilot wire. Current will, however, flow through the upper windings of relays D1 and D2 through the resistances 16 and 17 respectively to earth. Consequently both these relays will be energized and contacts 18 and 19 closed. Circuits will therefore be completed for the tripping coils TC1 and TC2 as will be readily appreciated and the circuit-breaker CB1 and CB2 will therefore be brought out. In this way the section is isolated. At the same time the contacts 14 and 15 will be opened but this is without effect in this particular case.

Conditions 4 and 5 are reciprocal and it is only necessary to consider one and for this purpose it will be taken into consideration where the fault on the line is fed from the left-hand end only. Under these conditions OL1 will be down, DR1 will be down, OL2 will be up and DR2 will be down. The circuit over the pilot wire can therefore be traced as follows: earth, battery, contact 9, contact 6, lower winding of relay D1, contact 14, pilot wire 13, contact 15, lower winding of relay D2, contact 7 to earth. Relay D1 will also receive a current through its upper winding and resistance 16 to earth in a branch of the above circuit. Consequently relay D1 will not be energized while relay D2 will be energized. The closure of contact 19 completes a circuit for the tripping coil TC2 as follows: earth, battery, contact 11, contact 19, winding of tripping coil TC2 to earth. The tripping coil energizes and trips the circuit breaker CB2 at the same time opening contact 15. The opening of contact 15 breaks the circuit through the pilot wire and therefore relay D1 becomes excited through its upper winding only and therefore energizes and closes contact 18. Tripping coil TC1 therefore energizes as follows: battery, contact 9, contact 18, tripping coil TC1 to earth. Tripping coil TC1 energizes and cuts out the circuit-breaker CB1 and also opens contact 14. In this way the section is isolated. It will be clear that all that is necessary to cause the circuit-breaker CB1 to trip is to change the current in the pilot wire sufficiently whether up or down or, by reversal, to cause the balance in the windings of the differential relay D1 to be upset and cause relay D1 to energize.

In practice it may happen that there are considerable fluctuations in power and, where power may be fed from either end of the line, actual reversals in direction. In order to ensure that no faulty operation will take place it becomes desirable therefore to ensure that the directional relays DR1 and DR2 are more sensitive than the over-current relays OL1 and OL2. This may be done by providing a sufficient margin of current so that OL1 will not operate in case of a reversal of direction until the current has reached a larger value than is necessary to operate relay DR1. The same remarks of course apply to relays OL2 and DR2. If desired some form of time lag could be provided so as to ensure that the proper operation takes place as described, by which the directional relays always operate before the overcurrent relays.

Figure 5:
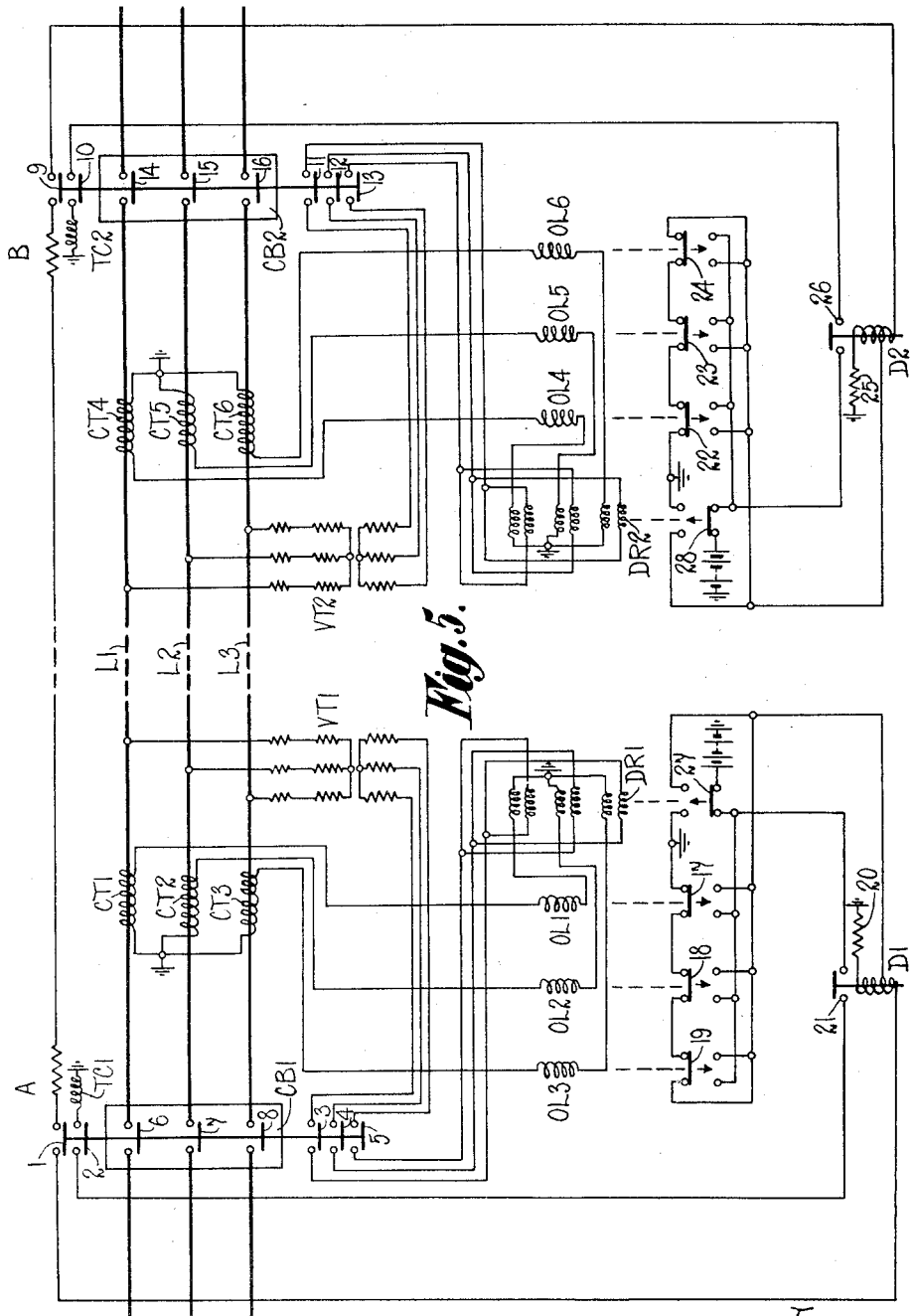
Fig. 5 shows in greater detail the circuit arrangement shown in the preceding figure.

Fig. 5 shows the circuit arrangements of Fig. 4 in more detail so that they can be readily understood. In this figure the circuit-breakers CB1 are provided with auxiliary contacts 1, 2, 3, 4 and 5, in addition to the main contacts 6, 7 and 8; while the circuit-breakers CB2 are similarly provided with auxiliary contacts 9, 10, 11, 12, 13 in addition to the main contacts 14, 15, 16; the auxiliary contacts 1 and 2 and 9 and 10 are arranged to be closed before the main contacts as these connect up the protective arrangements as will be understood from the further description. The three-phase power lines are represented by the reference L1, L2, L3. Three current transformers CT1, CT2, CT3 are provided one for each of the lines L1, L2, L3 for the purpose of supplying current to the overload relays OL1, OL2, OL3 and to one winding of each pair of the three pairs of windings of the directional relay DR1. A voltage transformer VT1 has its primary leads connected respectively to each of the leads L1, L2, L3 through suitable resistances and its secondary windings connected through the auxiliary contacts 3, 4, 5 of the circuit-breakers CB1 to the other windings of the directional relay DR1, these other windings being connected, as is well known, across the phases each one being connected across a different pair of phases. The arrangement is such that with an excess of current through any of the lines L1, L2, L3, that is an excess over a predetermined amount, the overload relay corresponding to the line on which the excessive current occurs will be energized with the result that one of the contacts 17, 18, 19 will be operated to open the series circuit through these contacts and to close its associated lower contacts which are connected in multiple with the lower contacts of the other overload relays. It will be noted that with this arrangement it does not matter whether one, two or all of the three relays OL1, OL2, OL3 are operated exactly the same circuit operation takes place, namely, the opening of the circuit through the upper contacts and the closing of a circuit through the lower contacts. The circuit arrangements controlled by the relays OL1, OL2, OL3 and by the relay DR1 are substantially identical with those described in connection with Fig. 4. The differential relay D1, the resistance 20, contact 21 and contact 1 all correspond to similar parts in the left-hand side of the said figure. The right-hand side of the drawing is identical with the left-hand side, as will be noted, and includes current transformers CT4, CT5, CT6 corresponding to the current transformers CT1, CT2, CT3, the voltage transformer VT2 corresponding to the voltage transformer VT1, the overload relays OL4, OL5, OL6 corresponding to the overload OL1, OL2, OL3 and the directional relay DR2 corresponding to the directional relay DR1. The contacts 22, 23, 24 are arranged similarly to the contacts 17, 18, 19. The directional relay DR2, resistance 25, contact 26 and contact 9 correspond to similar parts in Fig. 4. The tripping coils of the circuit breakers are represented by the references TC1 and TC2. The circuits of these coils in addition to including the contacts 21 and 26 respectively, also includes contacts 27 and 28 respectively of the directional relays DR1 and DR2 and the contacts 2 and 10 respectively of the circuit-breakers. Beyond showing three contacts 17, 18, 19 in place of one contact in the said Figure 4 and showing the additional contacts 2 and 10 on the circuit-breakers the controlling arrangements associated with the pilot wire are similar to those described in connection with Fig. 4 and it is thought unnecessary to repeat the description in full in connection with this drawing.

In Fig. 6 of the accompanying drawings, an arrangement is shown for protecting the underground cable 1 running between stations A and B from two different kinds of faults over a single pilot wire PW1. For this purpose use is made of quadruplex circuit arrangements using the variations in strength of the effective current acting on the differential relays DA and DB for protection for faults of the kind in which voltage of the system is reduced to a very low value and using the variations in direction of the resultant ampere turns influencing the polarized differential relays PDA and PDN for protection from incipient faults which do not materially affect the voltage of the system. Each differential relay DA and DB is marginal and will operate only when the resultant magnetizing effect due to the combined effect of the two halves of the windings exceeds a predetermined value. If the resultant magnetizing falls a certain amount below the predetermined value the relay automatically restores.

Each polarized differential relay PDA and PDB is responsive to the direction of the resultant ampere turns produced by currents flowing in its two windings. Thus if the currents flowing through the windings of relay PDA are such that the resultant magnetizing flux is downwards, the relay is restrained, while if the resultant magnetizing flux is upwards the relay operates. The same operating conditions apply to relay PDB.

The variations of strength of the effective currents are controlled in part by directional relays DRA and DRB arranged to remain in the positions shown when current is flowing into this section and severally to take up the alternate positions when current above a predetermined value is flowing out of the section at the respective ends thereof. In conjunction with the directional relays overload relays OLA and OLB are arranged to operate when current above a predetermined value greater than the previously mentioned value flows into or out of the section.

It will be noticed that the batteries 7A and 7B alone are effective so long as either the respective directional relays or the respective overload relays are in their upper positions, that is to say so long as power is flowing out of the respective ends of the line section or so long as the flow of power past the respective overload relays is of insufficient value to operate the same; only when the respective directional relays and the respective overload relays are in their lower positions, that is to say, only when power is flowing into the respective ends of the line section and when the flow of power past the respective overload relays is of sufficient value to operate the same are the associated batteries 6A and 6B made effective.

T1 and T3 are tripping coils for the circuit breaker CBA at station A end of the line 10, whilst T2 and T4 are tripping coils for the circuit breaker CBB at station B end of the line 10. The tripping coils T1 and T2 are respectively controlled by directional relay DRA and differential relay DA, by directional relay DRB and differential relay DB and are effective only when energized by the associated batteries 6A and 7A in series and 6B and 7B in series respectively. Contacts 30A in the circuit of the tripping coil T3 are controlled by the polarized differential relay PDA whilst the direction of current flow through the coil is controlled by the reversing relay RRA and the tripping means associated with the coil is polarized so that it is effective only if current flows through the coil from left to right although current from the associated batteries 7A only is sufficient to effect operation. Similarly contact 23B of the circuit of the tripping coil T4 are controlled by the polarized differential relay PDB whilst the direction of current flow through the coil is controlled by the reversing relay RRB and the tripping means associated with the coil is polarized so that it is effective only when current flows through the coil from right to left, although current in the associated battery 7B only is sufficient to effect operation.

KW1 and KW2 are central zero kilowatt indicators (i. e. induction type wattmeters) measuring the power at each end of a section controlled by the pilot wire PW. The pointers or equivalent members P1 and P2 are adapted to engage contacts 11A and 12B when the power measured by the respective indicators is flowing from station A to station B and is increasing and to engage contacts 13A and 14B when the power flowing in the same direction and measured by the respective indicators is decreasing. On the other hand, if power is flowing from the station B to station A and the power measured by the indicators is increasing, the pointers P2 and P1 respectively engage contacts 14B and 13A, but if the power measured by the indicator is decreasing the pointers P2 and P1 respectively engage contacts 12B and 11A. The contacts 11A and 13A and the contacts 12B and 14B are mounted on a movable carriage controlled by motors having field windings M1, M2, M3 and M4 in such a way that when a pointer moves to engage a contact due to a change in the power flowing in or out of the section, the motors operate to move the contacts to a new position with the pointer out of engagement with both contacts. RA and RB are compensating resistances whilst RRA and RRB are reversing relays biased to the positions shown but adapted to be moved to the reverse positions by energization of their respective windings.

Now normally the power measured at one end of the cable will be the same as the power measured in the other end of the cable unless there is a fault on the line. If a fault occurs the power flowing into the cable at one end will increase, while the power flowing out of the cable at the other end will decrease, that is to say, assuming that the leak takes place when the power is flowing into the section at the left hand end, the indicator KW1 will show an increase of power and contact 11A will be closed. At the same time power flowing out at the right hand end of the section will be decreased and the contact 14B will be closed. A circuit will therefore be completed as follows: battery, motor armature MA1, pointer P1, contact 11A, winding of reversing relay RRA, field winding M2, battery. The motor operates in this circuit so as to move contact 11A away from the pointer P1, while the reversing relay RRA operates to reverse the polarity of the effective battery or batteries. Similarly operation occurs at the right hand end of the line, the reversing relay RRB being operated.

The following circuit conditions will now be considered. It has been assumed that power is flowing into the section from the left hand end and flowing out from the right hand end. Consequently, in the absence of any fault on the line section, relay DRA will be in the position shown while relay OLA will be, say, in the reverse position to that shown. The relays OLB and DRB will, therefore, be in the reverse position to that shown. Hence assuming that the value of power flow is constant under these conditions, the following circuit will be closed over the pilot wire. Earth, contacts 15A, 17A, 18A, positive pole of battery 6A, battery 6A, battery 7A and then from negative pole of battery 7A through contact 19A to the mid point of differential relay DA. Here the circuit divides, part of the current flowing through the lower winding of relay DA and the lower winding of polarized differential relay PDA and resistance RA to earth, while the other part of the current flows over the upper windings of relays DA and PDA over the pilot wire PW, upper windings of the relays PDB and DB to the mid point of the winding of relay DB, contact 22B, negative pole of battery 7B, battery 7B, contacts 21B and 20B to earth. The direction of current flow over the pilot wire will be assumed from positive to negative and thus in this case would be from station B to station A. A circuit may also be traced as follows: earth, contacts 20B and 21B, positive pole of battery 7B, battery 7B, contact 22B, mid point of the winding of relay DB, lower winding of relays DB and PDB, compensating resistance RB to earth.

The resultant effect as regards relays DA, PDA, DB and PDB will now be considered.

With regard to relay DA, current will flow upwards through the lower winding and will depend for its strength on the voltage of the batteries 6A and 7A in series. Current flows downwards in the upper winding of relay DA and its strength will depend on the voltage of batteries 6A and 7A in series with 7B which is connected up in opposition. Resistances RA and RB are compensating resistances which balance the resistance of the pilot wire and the upper windings of the relays at the other end of the pilot wire so that the currents will always be in proportion to the voltages in the respective circuits. Hence the current through the upper winding of relay DA will be proportional to the voltage of battery 6A while that through the lower winding of relay DA will be proportional to the voltage of 6A and 7A. Hence the resultant magnetic flux will be proportional to the voltage of 7A and relay DA will remain unoperated since the magnetic flux will be insufficient to operate the relay.

With regard to relay PBA similar reasoning will be applied. The direction of magnetic flux is opposite in the two windings and since the direction of the resultant magnetic flux is downwards the relay will not operate, and hence will remain in the position shown.

With regard to relay PDA the magnetic flux in the two windings is in the same direction but the resultant flux is downwards and therefore in the wrong direction as regards the operation of the relay and it will also remain in the position shown.

With regard to relay DB current flow is in an upward direction in both windings, the current flow in the lower winding proportional to the voltage of battery 7B, while that in the upper winding is proportional to the voltage of battery 6A. The resultant magnetic flux will in this case be sufficient to operate relay DB. As relay DRB is operated, however, the operation of relay DB is of no effect at this time.

Consider now the case where there is no fault on the line and power flow increases at both ends. Relay RRA will in this case be operated as well as relays OLA, DRB and OLB. In this case the circuit over the pilot wire PW extends as follows: earth, contact 24A, negative pole of battery 7A, batteries 7A and 6A in series, contacts 18A, 17A, 25A, midpoint of the winding of differential relay DA where the circuit divides, one branch passing through the lower winding of the relays DA and PDA and resistance RA to earth. The other branch extends over the upper windings of relays DA and PDA, the pilot wire PW, upper winding of relays PDB and DB, the mid point of the winding of relay DB, contact 22B, negative pole of battery 7B and thence from the positive pole of battery 7B through contacts 21B, 20B to earth.

It will be noted that the effect of this is to connect the batteries 7A and 6A of the section battery 7B in series and in the same sense. Under this condition a local circuit at the station B end of the line may be traced as follows: earth, contact 20B, 21B, positive pole of battery 7B, battery 7B, contact 22B to the mid point of differential relay DB and then over the lower windings of relays DB and PDB and resistance RB to earth. The current through the upper winding is sufficiently greater than the current through the lower winding to cause relay PDB to energize and close contact 23B. A circuit can thereupon be traced as follows: earth, contact 23B, tripping coils T4, contact 22B, negative pole of battery 7B, battery 7B, contacts 21B and 20B to earth. The tripping relay, however, is polarized and cannot operate when current flows through the coil T4 in this direction. Relay DB is also operated but since relay DRB is also operated this is of no effect as regards the energization of the trip coil T2.

With regard to relays DA and PDA, however, neither of these relays will operate since the current flowing through the lower windings is proportional to the voltage of batteries 6A and 7A in series and is in opposition to the current flowing in the upper winding of the relays. Further, the current flowing through the upper windings is proportional to the voltage of batteries 6A, 7A and 7B in series, and hence the resultant magnetic flux will be insufficient to cause the operation of these relays.

It will be clear that if the current flowing through the section were to decrease reversing relay RR2 would operate in the following circuit: battery, motor armature MA2, contact 14B, reversing relay RRB, field winding M3, to battery. The operation of reversing relay RRB under circuit conditions similar to those described above would produce some similar conditions to those described in connection with the operation of relay RRA, but the relay DB will again operate to no effect since relay DRB is still operated. Further, relay PDA will operate instead of relay PDB but this will also be without effect owing to the resultant direction of current flow in the trip coil T3.

If an earth fault occurs on the section, then currents through the indicator KW1 will cause it to indicate an increased current so as to energize relay RRA while the indicator KW2 will record a decreased current thereby energizing relay RRB. When both relays RRA and RRB are energized and relays OLA, OLB and DRB are operated, the following circuit may be traced: earth, contact 24A, negative pole of battery 7A, batteries 7A and 6A in series, contacts 18A, 17A, 25A to the mid point of the winding of differential relay DA. Here the circuit divides, one half passing through the lower winding of relays DA and PDA to earth over resistance RA, while the other half passes through the upper winding of the relays DA and PDA, pilot wire PW upper winding of relays PDB and DB to the mid point of the winding of relay DB, contacts 26B, 21B, positive pole of battery 7B, battery 7B, contact 24B to earth. A circuit may also be traced from earth contact 24B, negative pole of battery 7B, battery 7B, contacts 21B and 26B, mid point of winding of differential relay DB and lower windings of relays DB and PDB to earth. With regard to relay DA, the current flowing through the windings is in opposition and hence the relay will not operate. The same applies to relay PDA, but the resultant magnetic flux is upwards and proportional to the voltage of the battery 6A so that this relay will operate. The current flow in the two windings of relay PDB is in the same direction and since the resultant magnetic flux is upwards this relay will also operate. Relay DB will also operate since the current flow in the two windings is in the same direction but the operation of this relay has no effect since relay DRB is operated.

On the operation of relays PDA and PDB trip circuits are closed as follows: earth, contacts 23B, trip coil T4, contacts 26B and 21B, positive pole of battery 7B, battery 7B, contacts 24B, to earth. The direction of current in this case is such that the polarized tripping means operate thereby isolating the section at station B. At station A relay PDA also operates because of the current flowing in the circuit described through this lower winding and closes contact 30A thereby completing a further tripping circuit as follows: earth, contact 30A, tripping coil T3, contacts 25A, 17A and 18A, positive pole of battery 6A, battery 6A, battery 7A, contact 24A to earth. The current in this circuit is such as to operate the trip coil and the circuit breaker CBA is tripped. It may be mentioned that relay DB is also operated but is ineffective since relay DRB is operated.

If the fault occurs in the line section whilst the power flow is sufficient to operate the overload relays OLA, OLB, the reversing relays RRA and RRB and the polarized differential relays PDA and PDB will, nevertheless be operated and, in view of the above description, their operation will be readily understood. Thus, whenever the power flowing into the section AB from station A increases and at the same time the power flowing out of the section from station B decreases, the section is isolated. As mentioned above, the tripping coils T1 and T2 are arranged so that they do not operate with current from battery 7A or 7B only, but they operate when the associated directional relay is in the position shown so as to connect battery 6A or 6B in series with battery 7A or 7B respectively. Thus in the case when, for instance, relays DB, OLB and DRB are operated, current from the battery 7B will flow through the tripping coil T2 while the section is sound, as will be readily understood.

If the flow of power through the line is from station B to station A and an earth fault occurs so that the power flow at station B end of the line increases, while the power flow at station A end of the line decreases then the pointer P1 engages contact 11A and the pointer P2 engages the contact 14B whereupon reversing relays RRA and RRB are operated and the faulty section is isolated by the tripping of the circuit breakers at its opposite ends.

If, whilst no current is flowing in the line section a fault occurs so that the power flow at both ends increases and the current flow inwardly, then pointer P1 engages contact 11A and pointer P2 engages contact 14B. Reversing relays RRA and RRB, are therefore, operated and the faulty section is isolated by the tripping of the circuit breakers at its opposite ends.

If, for any reason the kilowatt indicators KW1 and KW2 and the associated relays fail to give the protection for which they are provided and the fault becomes sufficiently severe to cause the reversal of current in the line at that end thereof at which current was leaving the line, then relays DA and DB are operated and effect the isolation of the line section.

This application is a division of our copending application, Serial No. 365,527, filed May 23, 1929.

What we claim is:—

1. In an electric power transmission system an electric cable having power conductors and a pilot wire embedded therein, a source of electrical energy for supplying power to the power conductors of said cable, apparatus located at one end of the cable for controlling the disconnection of said cable from the system at that end in the event of a fault occurring therein including a directional relay responsive to current flowing in the power conductors at that end, an electromagnetic relay, a circuit-breaker and a tripping coil for said circuit breaker, a second apparatus located at the other end of said cable including a directional relay responsive to the current flowing in the power conductors at said other end of said cable, an electromagnetic relay, a circuit-breaker and a tripping coil for said circuit breaker, auxiliary sources of electrical energy independent of said first source one at each end of said cable, a circuit extending between the two ends of said cable and including said pilot wire and said auxiliary sources of electrical energy to enable the directional relay of one apparatus to control the electro-magnetic relays of the other apparatus and means controlled by the directional relay at one end in response to particular current conditions in said power conductors for closing a point in the circuit of the local tripping coils simultaneously with it exerting a control over said pilot wire tending to cause the electromagnetic relay at the distant end to close a circuit in the said tripping coil at said distant end and means controlled by the directional relay at the other end in response to particular current conditions in the power conductors at said other end for closing a point in the circuit of a local tripping coil simultaneously with it exerting a control over said pilot wire tending to cause the electromagnetic relay at the distant end to close a point in the circuit of the tripping coil at the distant end, the circuit arrangements being such that in the event of a fault in the power line both switching devices will operate to cause the circuit of the tripping coils at each end to be completed.

2. In an electric power transmission system an overhead transmission line, a source of electrical energy for supplying power to said line, a stranded earthing wire for said line, an insulated pilot wire forming one of the strands of said earthing wire, apparatus located at one end of the line for controlling the disconnection of said line from the system at that end in the event of a fault occurring therein including a directional relay responsive to current flowing in the line at that end, an electromagnetic relay, a circuit-breaker and a tripping coil for said circuit breaker, a second apparatus located at the other end of said line including a directional relay responsive to the current flowing in the line at said other end, an electro-magnetic relay, a circuit-breaker and a tripping coil for said circuit-breaker, auxiliary sources of electrical energy independent of said first source one at each end of said line, a circuit extending between said apparatus including said pilot wire and auxiliary sources of electrical energy to enable the directional relay of one apparatus to control the electromagnetic relays of the other apparatus and means controlled by the directional relay at one end in response to particular current conditions in said line for closing a point in the circuit of the local tripping coil simultaneously with it exerting a control over said pilot wire tending to cause the electromagnetic relay at the distant end to close a point in the circuit of the tripping coil at said distant end and means controlled by the directional relays at the other end in response to particular current conditions in the line at said other end and for closing a point in the circuit of the local tripping coil simultaneously with it exerting a control over said pilot wire tending to cause the electromagnetic relay at the distant end to close a point in the circuit of the tripping coil at the distant end, the circuit arrangements being such that in the event of a fault in the line both switching devices will operate to cause the circuit of the tripping coils at each end to be completed.

3. In an electric power transmission system an electric cable having power conductors and a pilot wire embedded therein, a source of electrical energy for supplying power to the power conductors of said cable, a circuit-breaker at one end of said cable, a directional relay responsive to the direction of current flowing at the other end of said cable, a source of direct current of electrical energy arranged to be connected in circuit with said pilot wire, a tripping coil for said circuit-breaker, a balancing circuit for said pilot wire, a differential relay controlling the circuit of said tripping coil and having the end of one winding connected to said pilot wire and the other winding connected at one end to said balancing circuit and at the other end to the other end of said first winding so that when said first source of electrical energy is connected to the junction of said windings equal currents flow over both windings and the relay is inoperative and means controlled by said directional relay for changing the current flowing over the pilot wire and said first winding of said differential relay without affecting the current flowing through the said other winding to cause the differential relay to operate and close contacts in the circuit of said tripping coil, and thereby control the operation of said circuit-breaker to disconnect the power conductors at that end from the system in the event of a fault.

4. In an electric power transmission system an overhead transmission line, a source of electrical energy for supplying power to said line, a stranded earthing wire for said line, an insulated pilot wire forming one of the strands of said earthing wire, a circuit-breaker at one end of said line, a directional relay responsive to current flowing at the other end of said line, a source of direct current of electrical energy arranged to be connected in circuit with said pilot wire, a tripping coil for said circuit-breaker, a balancing circuit for said pilot wire, a differential relay controlling the circuit of said tripping coil and having the end of one winding connected to said pilot wire and the other winding connected at one end to said balancing circuit and at the other end to the other end of said first winding so that when said first source of electrical energy is connected to the junction of said windings equal currents flow over both windings and the relay is inoperative and means controlled by said directional relay for changing the current flowing over the pilot wire and said winding of said differential relay without affecting the current flowing through the said other winding to cause the differential relay to operate and close contacts in the circuit of said tripping coil and thereby control the operation of said circuit breaker to disconnect the power conductor at that end from the system in the event of a fault.

5. In an electric power transmission system an electric cable having power conductors and a pilot wire embedded therein, a source of electrical energy for supplying power to the power conductors of said cable, a source of direct current electrical energy, a polarized relay connected to one end of the pilot wire, means for connecting said source of current to said pilot wire so as to cause current to flow thereover and through said polarized relay in such a direction as not to affect its operation, a circuit-breaker located at the same end of the cable as the polarized relay, a tripping coil for said circuit-breaker, a switching device located at the other end of said cable and responsive to the direction of power flowing in the power conductors at that end and means controlled by said switching device for reversing the direction of current flowing over said pilot wire to operate said polarized relay and in the event of a fault complete the circuit of the tripping coil so as to cause the circuit-breaker to open the cable at the end where the polarized relay is located.

6. In an electric power transmission system an overhead transmission line, a source of electrical energy for supplying power to said line, a stranded earthing wire for said line, an insulated pilot wire forming one of the strands of said earthing wire, a source of direct current electrical energy, a polarized relay connected to one end of the pilot wire, means for connecting said source of current to said pilot wire so as to cause current to flow thereover and through said polarized relay in such a direction as not to affect its operation, a circuit-breaker located at the same end of the line as the polarized relay, a tripping coil for said circuit-breaker, switching devices responsive to the power flowing in said line at the other end to that at which the polarized relay is located and means controlled by said switching devices for reversing the direction of current flowing over said pilot wire to energize said polarized relay and in the event of a fault effect the operation of said tripping coil so as to cause the circuit-breaker to open the line at the end where the polarized relay is located.

7. In an electric power transmission system an electric cable having power conductors and a pilot wire embedded therein, a source of electrical energy for supplying power to the power conductors of said cable, a balancing circuit for said pilot wire, a differential relay having the end of one winding connected to said pilot wire and the other winding connected between said balancing circuit and other end of said first winding so that when a source of electrical energy is connected to the junction of said windings equal currents flow over both windings and the relay is inoperative, a polarized differential relay having its windings connected in circuit with the windings of said differential relay respectively arranged so that when a source of electrical energy is connected to the junction of said windings equal currents flow over both windings and the relay is inoperative, means controlled by current flowing in said power line for varying the strength of current flowing over the pilot wire and said first windings of said polarized differential relay without affecting the current flowing over said other windings to cause said differential relay to operate, means controlled by current flowing in said power line for changing the direction of current flowing over the pilot wire and said first windings of said differential relay and said polarized differential relay without affecting the current over said other windings to cause said polarized differential relay to operate and means controlled by said differential relay to cause the power line to be opened at the end where the differential relay is located in the case of a fault.

8. In an electric power transmission system an electric power line including power conductors and a pilot wire the pilot wire being so located with respect to the power conductors that in the case of an accident to the power conductors the pilot wire may be broken, a source of electrical energy for supplying power to the power conductors of said line, directional relays located at each end of said line controlled in accordance with the direction of power flowing in the lines at the ends thereof, devices located at each end of said line variably responsive according to the amount of power flowing in said power conductors at the ends thereof, balancing circuits for the pilot wire located at each end of said line, differential relays and polarized differential relays one of each being located at each end of said line each relay having a winding connected in series with the winding of the other relay and with the balancing circuit at that end and the other windings connected in series with the pilot wire, sources of direct current electrical energy at each end of said line arranged to permit of different potentials being applied to the pilot wire at each end, means at each end controlled by the directional relays at the same ends for connecting either low potential or high potential from the sources of electrical energy to the junction points of the two sets of windings of the polarized and differential relays at each end, means at each end controlled by said variably responsive devices at the same ends for reversing the polarity of the sources of electrical energy thereat, circuit breakers at each end of said line, tripping coils for said circuit breakers and means controlled by said differential and polarized differential relays for operating said tripping coils and causing the circuit-breakers to isolate the section when the direction of current flowing in the power lines is in opposite directions or varies in amount at the two ends indicative of a fault on the line.

REGINALD OTTO KAPP.
CHARLES GEORGE CARROTHERS.